(12) United States Patent
Hutton

(10) Patent No.: US 6,724,314 B2
(45) Date of Patent: Apr. 20, 2004

(54) AUTOMATED PASSENGER LOADING BRIDGE

(75) Inventor: Neil Hutton, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 56 days.

(21) Appl. No.: 10/025,500

(22) Filed: Dec. 26, 2001

(65) Prior Publication Data

US 2003/0120358 A1 Jun. 26, 2003

(51) Int. Cl.[7] .............................................. G08B 21/00
(52) U.S. Cl. ..................... 340/686.1; 340/958; 14/69.5; 14/71.5; 700/13; 700/71
(58) Field of Search ............................. 340/686.1, 945, 340/947, 948, 950, 952, 958; 14/71.5, 71.7, 69.5, 71.1; 244/114 R, 137.1; 700/13, 50, 30, 71, 253; 318/580, 583, 585, 587

(56) References Cited

U.S. PATENT DOCUMENTS

| | | | | |
|---|---|---|---|---|
| 4,253,541 A | * | 3/1981 | Iida et al. .................... 180/168 |
| 4,884,202 A | * | 11/1989 | Ogawa et al. ................. 701/26 |
| 5,155,684 A | * | 10/1992 | Burke et al. ................... 701/25 |
| 5,219,036 A | * | 6/1993 | Schwager et al. .......... 180/168 |
| 5,226,204 A | * | 7/1993 | Schoenberger et al. ...... 14/71.5 |
| 5,257,431 A | | 11/1993 | Larson et al. |
| 6,023,665 A | * | 2/2000 | Millgard ..................... 702/151 |
| 2002/0030609 A1 | * | 3/2002 | Baumgartner et al. ...... 340/958 |

FOREIGN PATENT DOCUMENTS

| | | | |
|---|---|---|---|
| WO | WO 96/08411 | | 3/1996 |
| WO | WO 01/34467 A1 | * | 11/2000 |
| WO | WO 01/34467 | | 5/2001 |

* cited by examiner

Primary Examiner—Daniel J. Wu
Assistant Examiner—Son Tang
(74) Attorney, Agent, or Firm—Freedman & Associates

(57) ABSTRACT

Disclosed is a method and apparatus for automatically aligning a passenger bridge to a door of an aircraft. The apparatus includes a sensor in the form of a laser range finder, a local computer for receiving signals from the sensor and for controlling bridge movement in dependence thereof, and memory storage for storing data relating to features of aircraft models with which the bridge is to be connected. Automated bridge alignment proceeds under the control of the local computer in dependence upon a determined error factor exceeding a predetermined minimum threshold value, which value is one of a default value and a value specified by a user of the apparatus. Accordingly, the instant invention permits different airlines to accept varying levels of risk associated with automatic bridge alignment.

38 Claims, 6 Drawing Sheets

AUTOMATED PASSENGER LOADING BRIDGE

FILED OF THE INVENTION

The present invention relates generally to passenger loading bridges and more particularly to automated passenger loading bridges for servicing an aircraft absent the intervention of a bridge-operator.

BACKGROUND OF THE INVENTION

In order to make aircraft passengers comfortable, and in order to transport them between the airport terminal and the aircraft in such a way that they are protected from weather and other environmental influences, passenger loading bridges are used which can be telescopically extended and the height of which is adjustable. For instance, an apron drive bridge in present day use comprises a plurality of adjustable modules, including: a rotunda, a telescopic tunnel, a bubble section, a cab, and elevating columns with wheel carriage. Manual, semi-automated and fully-automated bridge alignment systems are known in the prior art for adjusting the position of the passenger loading bridge relative to an aircraft, for instance to compensate for different sized aircraft and to compensate for imprecise parking of an aircraft at an airport terminal, etc. Of course, other types of bridges are known in the art, such as for example nose loaders and pedestal bridges.

Often, manual bridge alignment systems are preferred by the airlines because a trained bridge-operator is present and is able to observe directly the movements of the bridge relative to the aircraft. Typically, the bridge-operator uses a control panel located within the cab section to adjust the bridge each time a flight arrives. Accordingly, the probability that the bridge will collide with an aircraft during an alignment operation is relatively small. It is in the airlines' best interest that such collisions are avoided, as the bridge is massive and may be moving rapidly, and accordingly even a relatively minor collision involving an aircraft and a passenger loading bridge can cause extensive damage to the aircraft. Of course, there is also a danger that such a collision will result in a fuel leak, thereby increasing the possibility of a fire or explosion near the terminal building. Furthermore, as an airline is unlikely to have an extra aircraft waiting and ready to fly, passengers are inconvenienced unnecessarily by having their flight cancelled.

Of secondary concern to the airlines is ensuring that the passenger bridge is aligned with the aircraft as rapidly as possible, thereby minimizing the time to complete passenger deplaning, cleaning, restocking etc. As such, semi-automated bridge alignment systems are known in the prior art, which systems allow the bridge to be moved rapidly to a preset position under the control of a computer. For example, some passenger bridges are equipped with controls which automatically cause the height adjustment mechanism to move the cab to a predetermined height. One type of automatic control for a vertical height adjustment mechanism includes an electric control which has a console equipped with a number of push button type switches, each of which is labeled with the name of a different type of aircraft. Actuating a switch causes the mechanism to move the bridge column to a preset location so that the cab is properly aligned with the door of the type of aircraft named on the switch label. Each switch in the console is connected to a mechanically actuated switch located adjacent the bridge column. When a switch is actuated, the bridge is moved until a cam mounted on the bridge column trips the mechanical switch, which interrupts power to the motor. The cam is positioned to trip the switch when the bridge reaches the preset position. Unfortunately, the bridge-operator must be present to press the switch for enabling the automated height adjustment. As such, the bridge-operator must arrive at the passenger bridge in advance of the aircraft, which wastes the time of the operator, or alternatively the bridge-operator initiates the height adjustment after the aircraft has arrived at the bridge, which inconveniences the passengers aboard the aircraft.

Schoenberger et al. in U.S. Pat. No. 5,226,204 describes an automatic loading bridge that uses video cameras in the control of the bridge. The system maneuvers an end of the bridge to a position close to the door, whereupon an operator controls the bridge during the last part of its movement by looking at images recorded by the video cameras. Suggestions are made in the patent specification that the system could be arranged to operate fully automatically using image-processing of the recorded images to calculate the distance between the bridge and the aircraft. However, image-processing is time-consuming, thus making the movement based thereon slow.

WO 96/08411, filed Sep. 14, 1995 in the name of Anderberg, describes a device for controlling the movement of a passenger bridge. When an aircraft has landed, a central computer, such as for instance a central computer located within a terminal building, transmits information on the type of aircraft to a local computer of the passenger bridge at an assigned gate. The local computer accesses a database and retrieves information on the positions of the doors for the type of aircraft that has landed, as well as information on the expected stop position for the type of aircraft at the assigned gate. The retrieved information allows the local computer to determine an absolute position of the door with which the bridge is to be aligned. Accordingly, the passenger bridge is moved under computer control to a position close to the determined position of the door, for example within 2–10 meters. The system includes sensors for providing real-time positional data for a cab end of the bridge to the local computer. The system further includes an electromagnetic distance meter for detecting the close approach of the passenger bridge to the aircraft and for reducing the speed of the passenger bridge in dependence thereon. Optionally, the bridge is preset to this position before the aircraft has stopped moving.

WO 01/34467, filed Nov. 8, 2000 also in the name of Anderberg, teaches that the above system is reliable only for movement to a position close to the aircraft. Thus, the bridge has to be operated manually during the remaining 2–10 meters of its movement. The WO 01/34467 reference also teaches an improvement to the above system, in which electromagnetic sensors are disposed along the distal end of the passenger loading bridge for transmitting a set of electromagnetic pulses in different directions and for detecting electromagnetic pulses after reflection on a craft. Based on the elapsed time between transmitting and detecting the electromagnetic pulses in different directions, a profile of distance as a function of direction is obtained. From the measured distance versus direction profile and the information stored in the computer, it is then possible to maneuver the bridge to the door of the craft.

Often, the tendency of an airline and/or an airport authority is to resist the implementation of a fully-automated passenger bridge alignment system because such systems lack a human operator's ability to anticipate a future problem with an alignment operation and to take preemptive action in order to avoid a collision. Furthermore, a first airline may be willing to tolerate a relatively higher probability of collision than a second airline, in order to utilize fully-automated bridge alignment more often, and thereby minimize turnaround time for their airplanes. As such, a fully-automated passenger bridge alignment system preferably includes a safety system for assessing a level of risk associated with a next bridge movement, and for comparing the level of risk to a predetermined threshold value. Most preferably, the predetermined threshold value is set to one of a default value, an airline specified threshold value and a threshold value that is imposed by local government and/or airport authorities.

It is a disadvantage of the system disclosed by Anderberg in WO 01/34467 that a movement of the passenger bridge is controlled in dependence upon sensed data, which is collected approximately coincidentally with the movement of the passenger bridge. Anderberg does not teach using the sensed data and previously sensed data to determine a risk associated with a future movement of the bridge, and as such the system cannot anticipate a problem associated with a next step of the passenger bridge movement. Furthermore, the system does not allow for individual airlines and/or authorities to specify an acceptable level of risk associated with moving the passenger bridge under computer control toward an aircraft.

It is a further disadvantage of both of the systems that are disclosed by Anderberg that information on the type of aircraft is obtained from an external information source, such as for instance a central computer located within a terminal building. Every maneuver of the bridge is performed in dependence upon knowing specific parameters for the instantaneous aircraft model, such as for instance the position of the door and the expected stopping position. Although the specific parameters are stored locally for every model of aircraft, only the central computer can provide information on the model of aircraft that has landed. It is a further disadvantage that the central computer may serve a plurality of bridges at an airport. As such, if there is a problem with the central computer then every one of the passenger bridges in communication therewith will go offline, and automated alignment will not be possible. Of course, at a highly automated airport, there is unlikely to be a sufficient number of bridge-operators to manually align every bridge until the system is repaired. It will therefore be necessary to 'mirror' the central computer using a redundant computer system, which unnecessarily adds expense. Alternatively, as suggested by Anderberg, the information on aircraft model is provided via a local data input device every time a flight arrives. Of course, a system in which a human must provide the aircraft model carries a greatly increased risk that an incorrect aircraft model will be provided as a result of human error particularly when similar designations such as "727", "737", "747", "757" have been used to identify aircraft models.

Another disadvantage of the system disclosed by Anderberg is that the central computer requires access to a flight information database of the airport. Such a database must be set up to be accessible by the central computer, and there may be serious security-related issues involved with providing widely distributed access to flight information. Furthermore, many airports around the world do not support databases that would be suitable for interfacing with a passenger bridge system as described by Anderberg. In those cases, the authorities considering an automated passenger bridge would demand a system capable of completely autonomous operation.

Yet another disadvantage of the system disclosed by Anderberg is that the system does not verify the type of aircraft until after the aircraft has come to a halt. This is undesirable for two reasons. First, if due to human error or some other reason the type of aircraft that is transmitted to the bridge is incorrect, then the bridge may be preset to a position in which a collision with the aircraft will occur. Secondly, if the type of aircraft is incorrect and a collision does not occur, then additional bridge positioning must be performed after the aircraft has stopped and has been correctly identified. Any additional positioning of the bridge after the aircraft has stopped will inconvenience the passengers aboard the aircraft.

It would be advantageous to provide a passenger bridge control system that pre-identifies the model of an aircraft that has landed without requiring access to an external flight-schedule database. It would be further advantageous to provide a passenger bridge control system for performing a passenger bridge alignment operation absent bridge-operator intervention, wherein the operation is monitored to ensure that future alignment steps are safe within a selectable predetermined tolerance. Such a control system is more flexible, and allows an airline to define an acceptable level of risk and thereby balance the advantage of rapid, automated bridge alignment against the disadvantage of a collision occurring. Alternatively, government authorities or an airport authority will determine this balance.

OBJECT OF THE INVENTION

In an attempt to overcome these and other limitations of the prior art it is an object of the instant invention to provide an apparatus and method for aligning automatically with the door of an aircraft, absent a collision occurring therebetween.

In an attempt to overcome these and other limitations of the prior art it is another object of the instant invention to provide an apparatus and method that allows a user to specify conditions under which an alignment operation may occur in an automated manner.

SUMMARY OF THE INVENTION

In accordance with an aspect of the instant invention there is provided an apparatus for positioning one end of a moveable bridge in relation to a door on a craft comprising:

a sensor for transmitting light and for detecting said light, to determine the position of the one end of the moveable bridge in relation to the craft and for providing a signal in dependence thereon; and, a processor for receiving the signal from the sensor and for determining a next movement of the one end of the moveable bridge in dependence upon the signal, the processor also for determining an error factor in the determination of the next movement of the one end of the moveable bridge and for performing one of i) stopping the movement of the one end of the moveable bridge prior to performing the determined next movement and in dependence upon the determined error factor being within a first predetermined range of values, and ii) automatically performing the determined next movement of the one end of the moveable bridge in dependence upon the determined error factor being within a second other predetermined range of values not overlapping the first predetermined range of values.

In accordance with another aspect of the instant invention there is provided an apparatus for prepositioning a passenger bridge in relation to a door on an aircraft comprising:

a passenger bridge including a first end moveable for abutting an aircraft having a door and a second end for fixedly engaging a building;

a sensor for transmitting light and for detecting said light, to determine the position of the first end of the passenger bridge in relation to the aircraft and for providing a signal in dependence thereof;

a processor for receiving the signal from the sensor and for determining a next movement of the first end of the passenger bridge in dependence upon the signal, the processor also for determining an error factor in the determination of the next movement of the bridge and for comparing the determined error factor to a threshold value and for providing a control signal in dependence upon the determined error factor;

a memory in communication with the processor for storing template data relating to an extractable feature for a plurality of different models of aircrafts relative to which the first end of the passenger bridge is to be positioned; and, a mechanism in communication with the processor for receiving the control signal therefrom, the mechanism for prepositioning the first end of the passenger bridge to a predetermined position in dependence upon the received control signal.

In accordance with another aspect of the instant invention there is further provided an apparatus for positioning one end of a moveable bridge in relation to a door on a craft comprising:

an imager for capturing a plurality of images of a craft and for providing a signal indicative of some of the plurality of images;

an image processor for receiving the signal from the imager, for determining a craft model therefrom, and for providing a second signal indicative of the determined craft model; and, a controller for receiving the second signal from the image processor and for determining a next movement of the one end of the moveable bridge in dependence upon the second signal, the processor also for determining an error factor in the determination of the next movement of the one end of the moveable bridge and for i) stopping the movement of the one end of the moveable bridge in dependence upon the determined error factor being within a first predetermined range of values, and ii) automatically performing the determined next movement of the one end of the moveable bridge in dependence upon the determined error factor being within a second other predetermined range of values not overlapping the first predetermined range of values.

In accordance with another aspect of the instant invention there is further provided a method for positioning one end of a moveable bridge in relation to a door on a craft comprising the steps of:

a) determining the position of the one end of the moveable bridge in relation to the craft;

b) determining a next movement of the one end of the moveable bridge in dependence upon the determined position, the next movement of the one end of the moveable bridge for moving the one end of the moveable bridge toward the craft;

c) determining an error factor associated with the determination of the next movement of the one end of the moveable bridge; and, d) performing the determined next movement of the bridge in dependence upon the determined error factor being within a predetermined range of values.

In accordance with another aspect of the instant invention there is further provided a method for positioning one end of a moveable bridge in relation to a door on an aircraft comprising the steps of:

a) determining the position of the one end of the moveable bridge in relation to the aircraft;

b) identifying a model of the aircraft and retrieving information relating to the position of a door on the identified model of the aircraft;

c) determining, in dependence upon the retrieved information, an expected stopping position of the door on the identified model of the aircraft;

d) determining a next movement of the one end of the moveable bridge in dependence upon the determined position of the one end of the moveable bridge and the expected stopping position of the door on the identified model of the aircraft, the next movement of the one end of the moveable bridge for moving the one end of the moveable bridge toward the expected stopping position of the door on the identified model of the aircraft;

e) determining an error factor associated with the determination of the next movement of the one end of the moveable bridge; and, f) performing the determined next movement of the bridge in dependence upon the determined error factor being within a predetermined range of values.

In accordance with another aspect of the instant invention there is further provided an apparatus for positioning one end of a moveable bridge in relation to a door on a craft comprising:

a sensor for sensing a location of the craft relative to the one end of the moveable bridge and for providing sensor data in dependence upon the sensed location; and, a controller for receiving the sensor data, and for determining a next movement of the one end of the moveable bridge toward the sensed craft in dependence upon the sensor data, the controller also for determining an error factor in the determination of the next movement of the one end of the moveable bridge toward the sensed craft and for performing one of i) stopping the movement of the one end of the moveable bridge prior to performing the determined next movement and in dependence upon the determined error factor being within a first predetermined range of values, and ii) automatically performing the determined next movement of the one end of the moveable bridge toward the sensed craft in dependence upon the determined error factor being within a second other predetermined range of values not overlapping the first predetermined range of values.

BRIEF DESCRIPTION OF THE DRAWINGS

Exemplary embodiments of the invention will now be described in conjunction with the following drawings, in which similar reference numbers designate similar items.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

Figure 1:
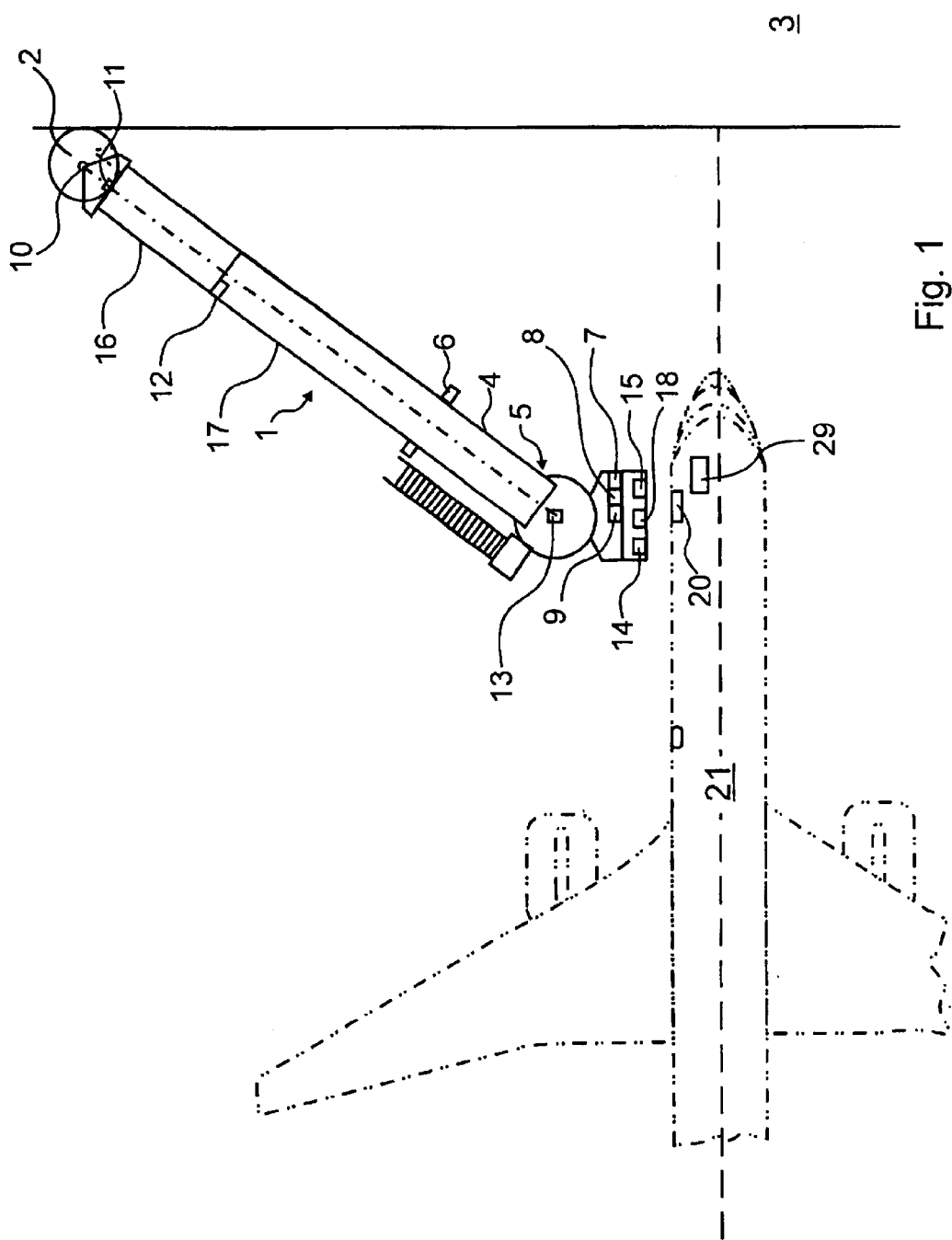
FIG. 1 shows a schematic top view of a passenger bridge for an aircraft, the bridge being equipped with a device according to the instant invention.

Referring to FIG. 1, shown is a schematic top view of a passenger bridge for an aircraft, the bridge being equipped with a device according to the instant invention. The passenger bridge 1 comprises a rotunda 2, which is connected to a terminal building 3 and from which extends a passageway 4. The passageway 4 ends with a pivotable cabin 5 and includes inner 16 and outer 17 passageway elements, wherein the inner element 16 is telescopically received within the outer element 17 such that the length of the passageway 4 is variable. Of course, each passageway element includes a left sidewall, a right sidewall, a floor member and a ceiling member. Optionally, a number of passageway elements other than two are provided. A control panel 8 is disposed within the cabin 5 to be used by a bridge-operator when it is necessary to adjust the bridge manually. Also shown in FIG. 1 is an aircraft 21 with a door 20, for instance a front left door of the aircraft, to which the passenger bridge is to be connected.

Advantageously, the modular design of the passenger bridge 1 allows the bridge to be guided to different positions in order to service a wide range of aircraft models, and/or a wide range of aircraft passenger door positions on either the right or left side of an aircraft. To this end, and as shown in FIG. 2, the passenger bridge 1 includes a bogie 30 with driving wheels 31 for achieving angular displacement of the passenger bridge as well as telescoping of the passageway elements 16 and 17 to alter the length of the passenger bridge 1. Referring again to FIG. 1, the passageway 4 is suspended from a frame 6 for adjusting the height of the passenger bridge 1. Finally, the passenger bridge 1 has means for pivoting the cabin 5 and for leveling a floor surface (not shown) thereof.

Referring still to FIG. 1, the passenger bridge 1 is equipped with first, second and third transducers 10, 11 and 12 to determine the angular position of the passageway, the height of the passageway and the relative positions of the passageway elements, respectively. The bridge is further equipped with a fourth transducer 13 to sense the angular position of the cabin 5. Optionally, the second transducer 11 is disposed proximate the frame 6 for determining the height of the passageway.

Of course, other types of transducers and/or other numbers of transducers and/or other locations of transducers are optionally used to determine the position of the bridge. For instance, a laser may be mounted on the roof of the cabin 5, as may at least two reflectors on different locations on the terminal building. By sweeping the laser, measuring the distance to the reflectors with the aid of the laser, and determining the angular position of the laser when directed toward the reflectors, the position of the cabin 5 may be determined.

Preferably, the passenger bridge 1 further comprises an electromagnetic distance meter 14 for sensing the close approach of the passenger bridge to the aircraft 21. Optionally, the distance meter 14 provides a signal to the local computer 7 for automatically reducing the rate of approach of the passenger bridge 1 to the aircraft 21 within a predetermined distance. Further optionally, one or more pressure sensors 15 are provided along a bumper at the cabin end of the passenger bridge 1 for sensing engagement with the aircraft 21. Of course, the distance meter 14 and the one or more pressure sensors 15 are effective only at very close approach to the aircraft 21, and as such they do not constitute a reliable system for collision avoidance absent the imager 18.

Figure 2A:
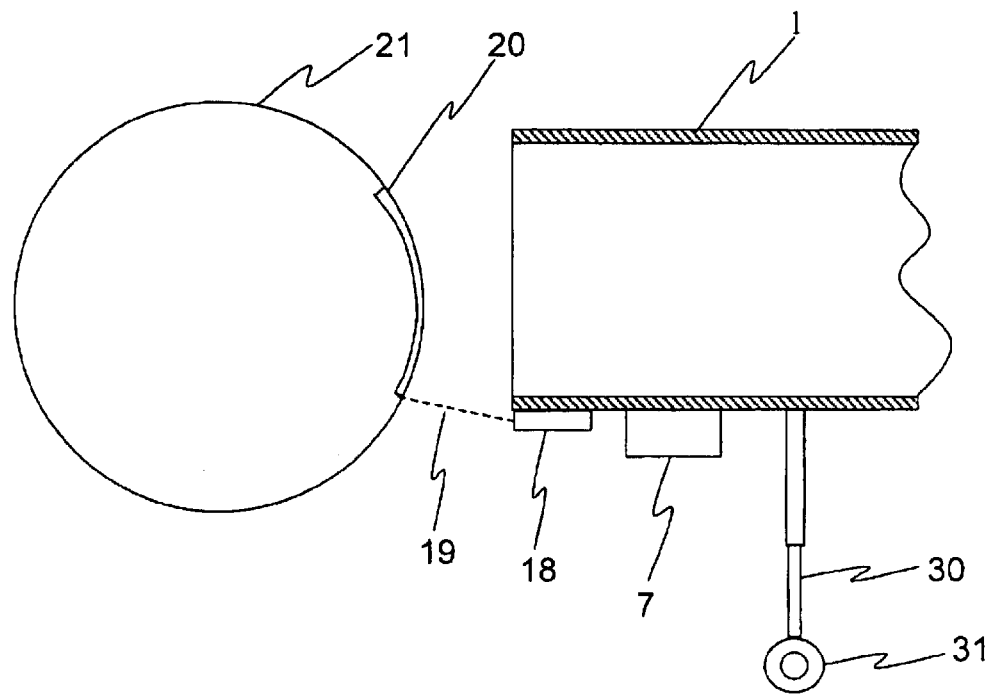
FIG. 2a is a more detailed view of a part of the passenger bridge close to the body of an aircraft, according to a first embodiment of the instant invention.

Referring now to FIG. 2a, shown is a more detailed view of a part of the passenger bridge 1 close to the body of the aircraft 21, according to a first embodiment of the instant invention. The passenger bridge 1 further comprises a local computer 7 which is connected to a sensor 18. In the first embodiment, the sensor comprises a transmitter (not shown) for transmitting electromagnetic radiation and a detector (not shown) for detecting electromagnetic radiation of the same wavelength after being reflected from an aircraft. Optionally, the transmitter and the detector are separated. The sensor 18 is arranged to repeatedly emit an electromagnetic pulse in a direction toward the aircraft, as indicated by the dotted line 19. The distance to the aircraft is determined by measuring a time difference between transmission of an electromagnetic pulse and detection of the electromagnetic pulse after reflection from the aircraft. In the preferred embodiment, the sensor 18 comprises a laser range finder (LRF). Advantageously, the LRF works under low ambient lighting conditions and as such, the system according to the instant invention may be used for nighttime arrivals. Optionally, the sensor 18 is used also to image the outline of the door 20 in order to identify and/or confirm the location of the door 20, thereby allowing the passenger bridge 1 to be aligned to the door 20 with improved reliability and reduced risk of collision. Of course, further optionally a video camera (not shown) is provided in addition to the sensor 18, the video camera for imaging the door 20 during passenger bridge alignment.

The local computer is connected to, and adapted to act upon, the means for positioning the passenger bridge, to be more specific, the means for adjusting the height of the passenger bridge, for adjusting the length of the passenger bridge by telescoping of the passageway elements, for pivoting the cabin 5 and for angularly displacing the passenger bridge 1.

In use, the sensor 18 scans an approach area in front of the gate area until a moving object is detected. Optionally, sensors disposed at ground level along the approach area, such as for instance pressure sensors, are used to detect the moving object and transmit a signal to the local computer 7 to initiate scanning by the system. An initial scan using the sensor 18 is performed to determine if the moving object is an approaching aircraft 21. If an aircraft 21 is confirmed, then the sensor 18 scans the aircraft and transmits a signal to the local computer 7 in dependence upon the scan. The local computer 7 processes the transmitted signal to pre-identify the model of the aircraft 21, i.e. at least one of the nose height and the door position is compared to values for a plurality of aircraft models that are stored in a database 9. The model of the approaching aircraft 21 is identified to at least within a group of possible models. Of course, other physical features of the aircraft are optionally used to identify the aircraft model, wherein the feature that is used varies depending upon the angle of approach of the aircraft etc.

Optionally, the local computer 7 retrieves data from the database 9 relating to a door height for the model or group of possible models and presets the bridge height to an appropriate position. Further optionally, the computer retrieves data relating to an expected parking position for the model or group of possible models, applicable to the particular airport apron layout, and presets the bridge end to a position that is close to the expected position of the door when the aircraft 21 has come to a halt. In a particularly preferred embodiment of the instant invention, the sensor 18 continues to monitor the aircraft 21 as it approaches the passenger bridge 1. Accordingly, the local computer 7 is provided with updated data as the aircraft 21 approaches the passenger bridge 1, thereby allowing the position of the passenger bridge 1 to be substantially optimized prior to the aircraft 21 coming to a stop.

When the local computer 7 detects that the aircraft has come to a stop, the passenger bridge is moved automatically from the optimized preset position to an aircraft engaging position. The sensor 18, for instance in the form of a laser range finder, is used to determine a distance between the bridge end and the aircraft fuselage and for providing a signal to the local computer 7 in dependence upon the determined distance. Laser range finding is well known in the art for determining a distance to an object and a detailed description of the basic principles will be omitted herein. The local computer 7 receives the signal from the sensor 18 and calculates a 'next' bridge movement in dependence thereon. The 'next' bridge movement includes movements that are achieved by acting upon, either individually or in combination, the means for positioning the passenger bridge, to be more specific, the means for adjusting the height of the passenger bridge, for adjusting the length of the passenger bridge by telescoping of the passageway elements, for pivoting the cabin 5 and for angularly displacing the passenger bridge 1. Preferably, the 'next' bridge movement is determined as a function of the determined distance. For instance, the maximum allowable size of a 'next' movement is made progressively smaller as the determined distance decreases. As such, the rate of approach of the passenger bridge 1 to the aircraft 21 is decreased automatically in order to reduce the possibility of a collision involving the two objects.

In order to reduce further the possibility of a collision, the local computer 7 also determines an error factor associated with the 'next' move determination. The error factor is related to the probability that the 'next' bridge movement can be performed without causing a collision involving the passenger bridge 1 and the aircraft 21. Thus, the error factor is conveniently expressed as one of a probability and a percentage. The local computer 7 compares the determined error factor to a threshold value, such as for instance one of a default threshold value and a threshold value selected by an airline and/or government authority. Of course, a selected threshold value is constrained to a range of values that provide reliable operation of the system. If the determined error factor exceeds the threshold value, then the local computer 7 provides a control signal for moving the bridge according to the determined 'next' bridge movement. If, however, the determined error factor is lower than the threshold value, the local computer 7 performs a corrective action. In a preferred embodiment, the local computer 7 calculates a different 'next' bridge movement that is smaller than the original 'next' bridge movement, determines a different error factor associated with the different 'next' move determination, and compares the different determined error factor to the threshold value. Optionally, the local computer 7 receives a different signal from the sensor 18 to verify the accuracy of the original range data. If the different determined error factor is lower than the threshold value, the local computer 7 logs an error message and a bridge-operator completes the operation.

At the completion of the 'next' bridge movement, the sensor 18 determines a new distance between the bridge end and the aircraft fuselage and provides a signal to the local computer 7 in dependence upon the determined new distance. The error factor determination steps, etc. occur as outlined above. When the passenger bridge 1 has approached to within a predetermined distance of the aircraft 21, it is connected and the system shuts down or enters a standby mode of operation.

Preferably, the error factor associated with the 'next' move determination is determined in dependence upon the determined distance to the aircraft, as well as diagnostic data relating to previous bridge movements. For instance, if the apron is icy or rain soaked then skidding is more likely to occur. When diagnostic data relating to previous bridge movements is indicative of poor operating conditions, then the error factor is scaled lower by an amount that is approximately proportional to the severity of skidding during previous movements. Accordingly, the system recognizes and accounts for poor operating conditions.

Optionally, a user interface (not shown) is provided for receiving authorization from a user of the bridge to perform a determined 'next' bridge movement when the determined error factor associated with the determined 'next' bridge movement is within a predetermined range of values. Accordingly, the system allows a human user to assess a risk associated with a next bridge movement during certain stages of the bridge alignment process. Advantageously, the user may authorize a 'risky' movement in order to allow the bridge to continue moving to a point from which fully automatic bridge alignment may resume.

An unforeseen advantage of the first embodiment of the instant invention will now be illustrated by way of example. The sensor 18 determines that the distance to the aircraft is, for example, 50 feet. The local computer 7 determines the 'next' bridge move, such as for instance a 5 foot telescoping of the passenger bridge 1, and calculates an error factor associated with moving the passenger bridge to the final position of the 'next' bridge move. In this example, the local computer 7 determines that there is greater than a 99% chance that the 'next' bridge move can occur absent a collision, and accordingly provides a signal to move the bridge. During the movement, the sensor 18 is 'blinded' by sunlight reflected from the windscreen of a service vehicle, and the sensor 18 is temporarily unable to determine the range to the aircraft. Since it is known that the current movement can be completed with greater than a 99% chance of avoiding a collision, the movement is allowed to continue absent real-time data from the sensor. Advantageously, the sensor 18 may move to a position by the end of the movement, from which position it is possible to determine the remaining distance to the aircraft. Preferably, there is a predetermined maximum distance that the bridge can be moved absent receiving new data or improving current data using sensor 18. Of course, optionally the local computer 7 is programmed to immediately pause bridge movement and/or log an error message if sensor 18 loses contact with the aircraft 21. Further optionally, when the bridge is within a predetermined distance from the aircraft then there is no acceptable risk with respect to guessing, and the alignment operation must be completed manually if sensor 18 loses contact with the aircraft 21.

Figure 2B:
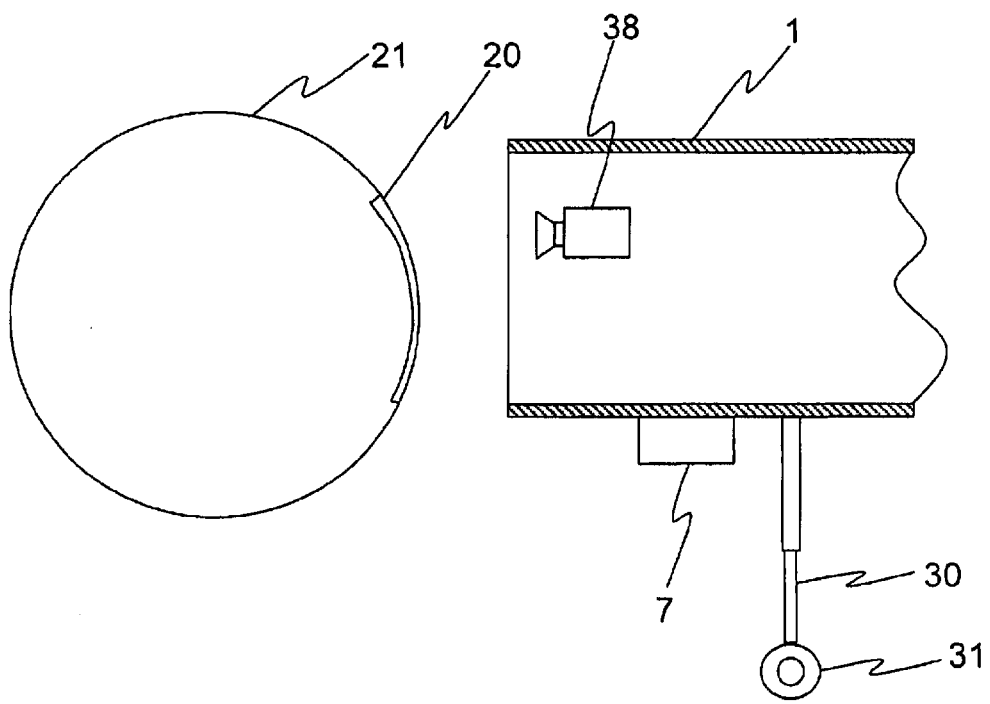
FIG. 2b is a more detailed view of a part of the passenger bridge close to the body of an aircraft, according to a second embodiment of the instant invention.

Referring now to FIG. 2b, shown is a more detailed view of a part of the passenger bridge 1 close to the body of the aircraft 21, according to a second embodiment of the instant invention. The passenger bridge 1 further comprises a local computer 7 which is connected to an imager 38, for instance an imager in the form of a video camera. The imager 38 is for capturing a plurality of video images of the aircraft 21 and for providing a signal indicative of some of the video images. Optionally, the signal is compressed using known video data compression algorithms to reduce the amount of data being transmitted to the local computer 7, thereby shortening the time period interval between capturing an image with the imager 38 and processing the image with the local computer 7.

In use, the imager 38 scans an approach area in front of the gate area until a moving object is detected. Optionally, sensors disposed at ground level along the approach area, such as for instance pressure sensors, are used to detect the moving object and transmit a signal to the local computer 7 to initiate scanning by the system. An initial scan using the imager 38 is performed to determine if the moving object is an approaching aircraft 21. If an aircraft 21 is confirmed, then the imager 38 scans the aircraft and transmits a signal to the local computer 7 indicative of the scanned image. The local computer 7 processes the transmitted signal to pre-identify the model of the aircraft 21, i.e. the local computer compares the image provided by the imager 38 with scale three-dimensional images for a plurality of aircraft models that are stored in a database 9. The model of the approaching aircraft 21 is identified to at least within a group of possible models, and the range and orientation of the identified aircraft 21 is determined based on the scale of the stored three-dimensional images.

Optionally, a separate image processor (not shown) is provided for receiving the transmitted signal from the video camera, for processing the signal to pre-identify the model of the aircraft 21, and for providing a second signal to the local computer 7 indicative of the pre-identified model of aircraft.

Figure 3:
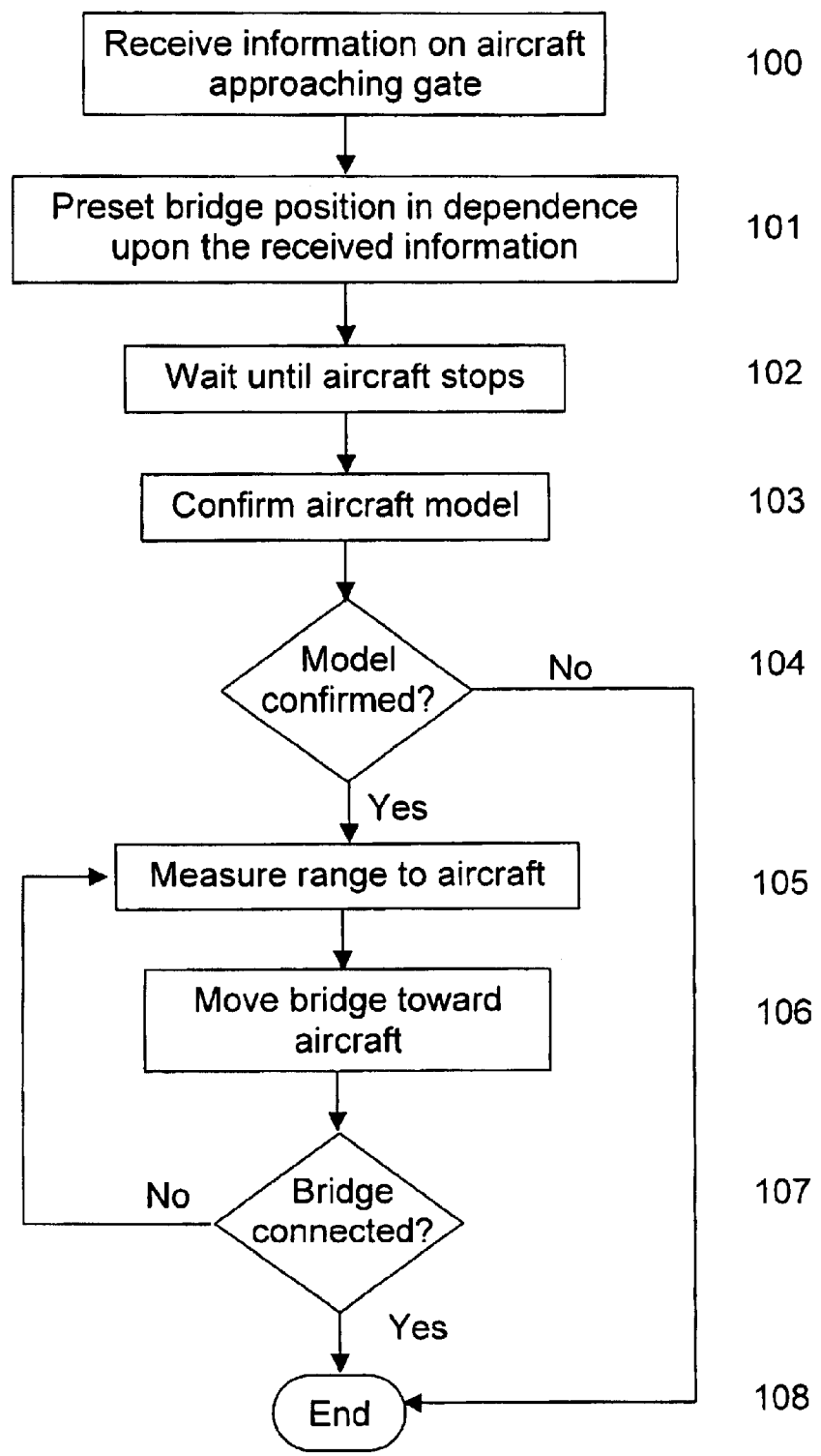
FIG. 3 shows a simplified flow diagram of a method of connecting a passenger bridge to an aircraft according to the prior art.

Referring now to FIG. 3, shown is a simplified flow diagram for a method of connecting a passenger bridge to an aircraft according to the prior art. When an aircraft has landed, a central computer at step 100 transmits information on the type of aircraft to a local computer of the passenger bridge. The central computer is, for instance, a central computer located within a terminal building of the airport and is in communication with a flight information database of the airport. The local computer accesses a local database and retrieves information on the positions of the doors for the type of aircraft that has landed, as well as information on the expected stop position for the type of aircraft. The retrieved information allows the local computer at step 101 to move the passenger bridge to a position close to an expected position of the door when the aircraft has stopped moving. After the aircraft has stopped moving at step 102, the model of the aircraft is confirmed at step 103. If it is determined at decision step 104 that the aircraft is not of the expected model, an error message is generated and the system shuts down at step 108, and awaits the arrival of a bridge-operator to perform the alignment manually. Alternatively, if the expected aircraft model is confirmed, then at step 105 a sensor on the passenger bridge measures the distance to the aircraft, provides a signal in dependence of the distance to a controller and the controller causes the bridge to move toward the aircraft at step 106. If it is determined at decision step 107 that the bridge has engaged the aircraft, then the system shuts down or enters a standby mode of operation at step 108. Otherwise, the steps 105–107 are repeated until it is determined at decision step 107 that the bridge has engaged the aircraft.

Figure 4:
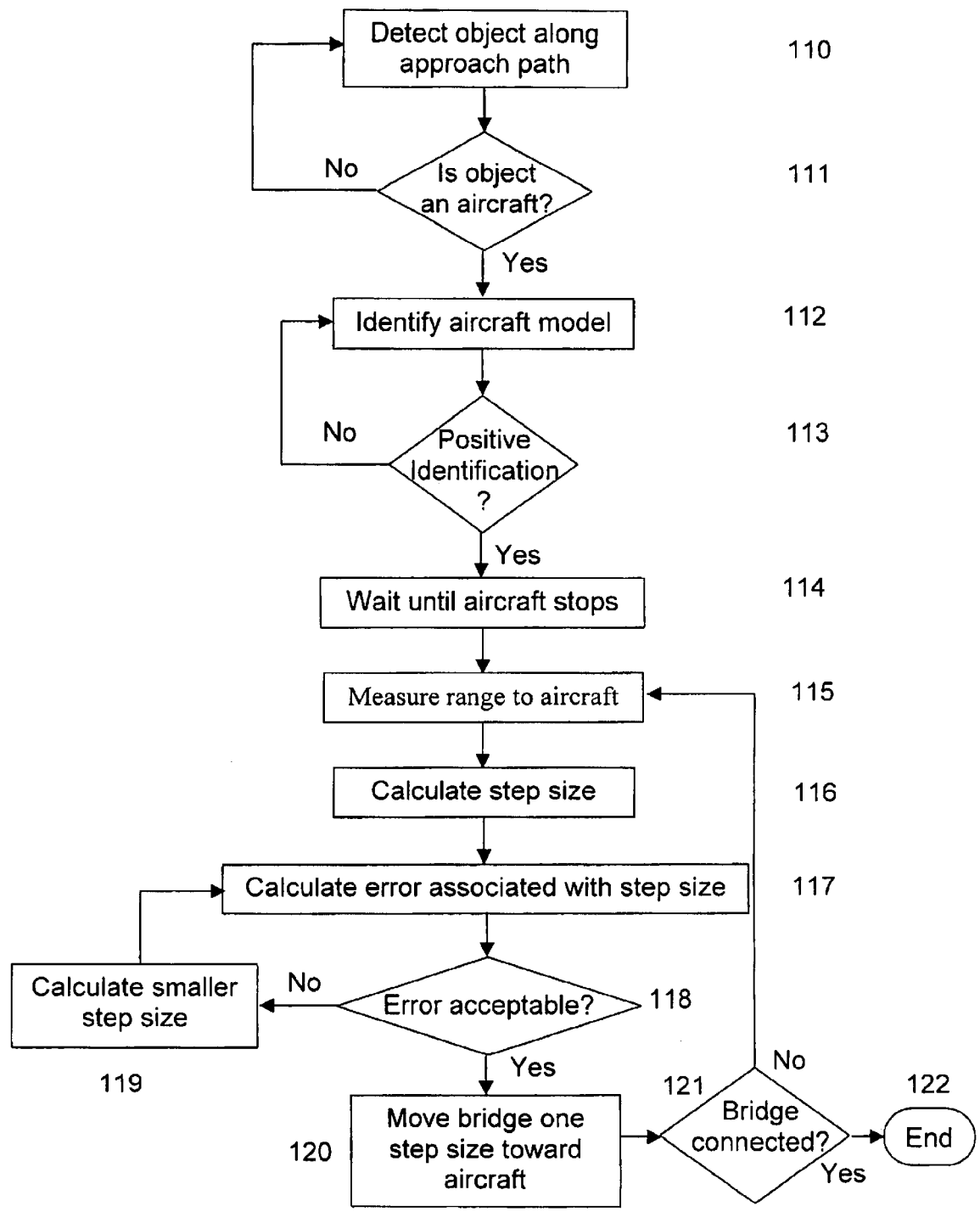
FIG. 4 shows a simplified flow diagram of a method of connecting a passenger bridge to an aircraft according to the instant invention.

Referring now to FIG. 4, shown is a simplified flow diagram of a method of connecting a passenger bridge to an aircraft according to the instant invention. When an aircraft has landed, a sensor 18 detects the aircraft and captures an image at step 110. The image is transmitted to a local computer 7, which performs image-processing to determine if the object is an aircraft. When it is confirmed at decision step 111 that the object is an aircraft, the processor performs additional processing at step 112 in order to identify the model of aircraft. If it is not possible at decision step 113 to confirm a specific aircraft model within a predetermined confidence limit, then the aircraft is characterized according to a type of aircraft, for instance a type of aircraft may include a plurality of similar aircraft, each aircraft having similar physical characteristics. Additional images are captured by the sensor 18 as the aircraft 21 continues to approach the passenger bridge 1, and the additional images are transmitted to the local computer 7 in order to positively identify the aircraft model prior to the aircraft 21 arriving at the gate area.

Once the aircraft model has been positively identified at decision step 113, the system waits at step 114 for the aircraft to come to a complete stop. After the aircraft has stopped, the sensor 18 determines the range between the passenger bridge and the aircraft at step 115. The local computer 7, having code in execution thereon, determines at step 116 a maximum step size for moving the passenger bridge toward the aircraft, in dependence upon the measured distance to the aircraft, predetermined risk tolerance provided to the local computer 7 and other data relating to the type of the aircraft. Prior to moving the passenger bridge 1, the local computer 7 calculates at step 117 an error factor associated with the determination of the maximum step size. If at decision step 118 the error factor is determined to be within a predetermined threshold value, then the bridge is moved toward the aircraft at step 120. If the error factor is outside a predetermined threshold value, then a smaller step size for moving the passenger bridge toward the aircraft is calculated at step 119 and steps 117 to 118 are repeated. The steps 115 to 121 of measuring a range to the aircraft, calculating a step size, assessing an error associated with moving the passenger bridge by that step size and moving the passenger bridge is repeated until it is determined at decision step 121 that the passenger bridge 1 is connected to the aircraft 21. The method of FIG. 4 terminates at step 122.

Figure 5:
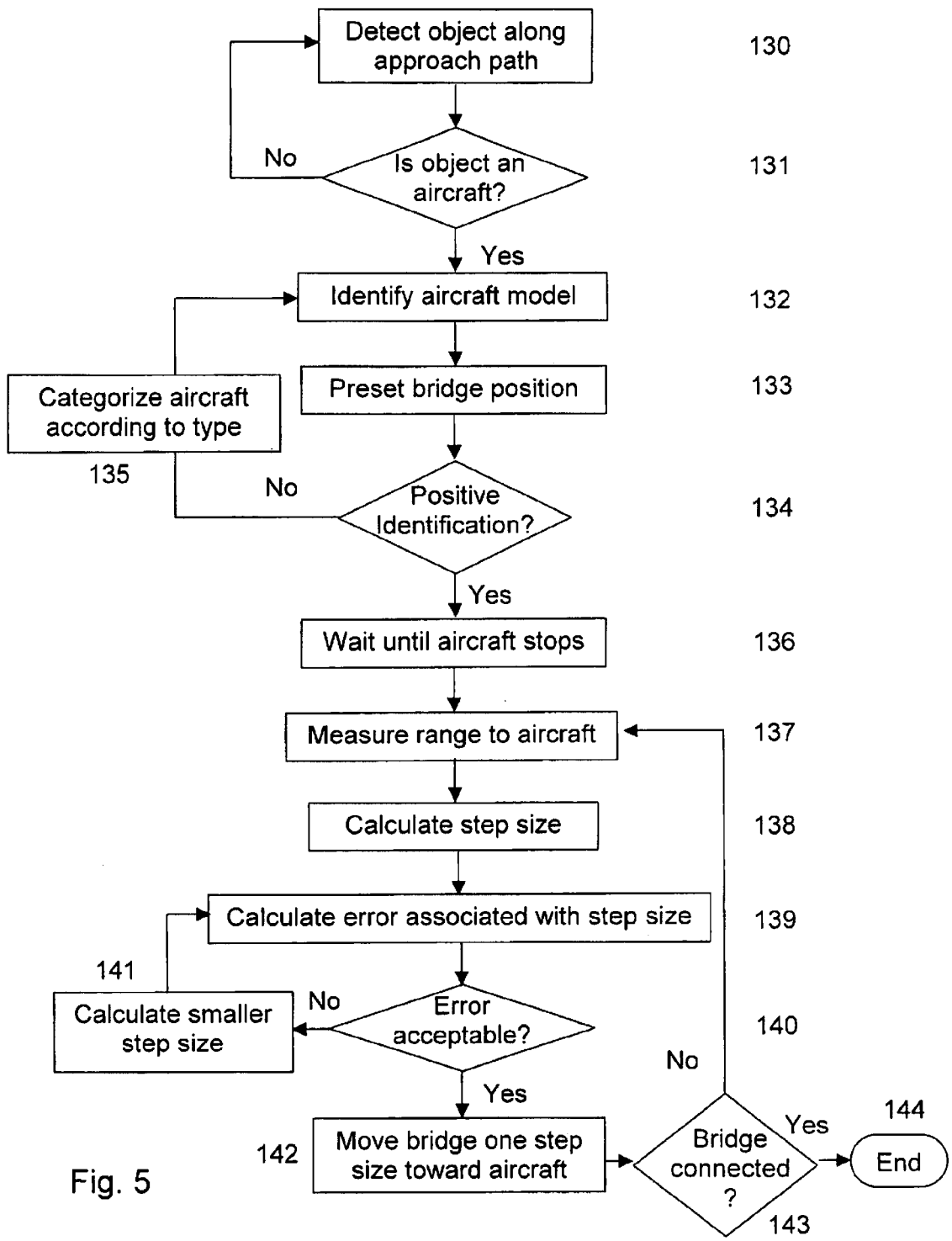
FIG. 5 shows a simplified flow diagram of another method of connecting a passenger bridge to an aircraft according to the instant invention.

Referring now to FIG. 5 shown is a simplified flow diagram of another method of connecting a passenger bridge to an aircraft according to the instant invention. When an aircraft has landed, a sensor 18 detects the aircraft and captures an image at step 130. The image is transmitted to a local computer 7 and image processing determines if the object is an aircraft. When it is confirmed at decision step 131 that the object is an aircraft, the local computer 7 performs additional processing at step 132 to identify the model of aircraft. The passenger bridge is then preset to an initial position for that model of aircraft at step 133. If it is not possible at decision step 134 to confirm a specific model within a predetermined confidence limit, then the aircraft is characterized according to a type of aircraft at step 135, for instance a type of aircraft may include a plurality of similar aircraft, having similar physical characteristics. Additional images are captured by the sensor 18 as the aircraft 21 continues to approach the passenger bridge 1, and the additional images are transmitted to the local computer 7 in order to positively identify the aircraft model prior to the aircraft 21 arriving at the gate area. As the aircraft 21 approaches the passenger bridge 1 and the specific model is being determined, the passenger bridge preset position is optimized in dependence upon the additional images that are provided by the sensor 18.

Once the aircraft has been positively identified at decision step 134 and the bridge has been preset to the correct initial position for that model of aircraft, the system waits at step 136 for the aircraft to come to a complete stop. Optionally, the system continues to monitor the approach of the aircraft to ensure that a minimum clearance between the bridge and the aircraft is maintained, such that a collision is avoided. After the aircraft has stopped, the sensor 18 determines the range between the passenger bridge 1 and the aircraft 21 at step 137. The local computer 7, having code in execution thereon, determines at step 138 a maximum step size for moving the passenger bridge toward the aircraft, in dependence upon the measured distance to the aircraft, predetermined risk tolerance provided to the local computer 7 and other data relating to the type of the aircraft. Prior to moving the passenger bridge, the local computer 7 calculates at step 139 an error factor associated with the determination of the maximum step size. If at decision step 140 the error factor is determined to be within a predetermined range of threshold values, then the passenger bridge is moved toward the aircraft at step 142. If the error factor is other than within a predetermined range of threshold values, then a smaller step size for moving the passenger bridge toward the aircraft is calculated at step 141 and steps 139 to 140 are repeated. The steps 137 to 142 of measuring a range to the aircraft, calculating a step size, assessing an error associated with moving the passenger bridge by that step size and moving the passenger bridge is repeated until it is determined at decision step 143 that the passenger bridge is connected to the aircraft. The method of FIG. 5 terminates at step 144.

Figure 6:
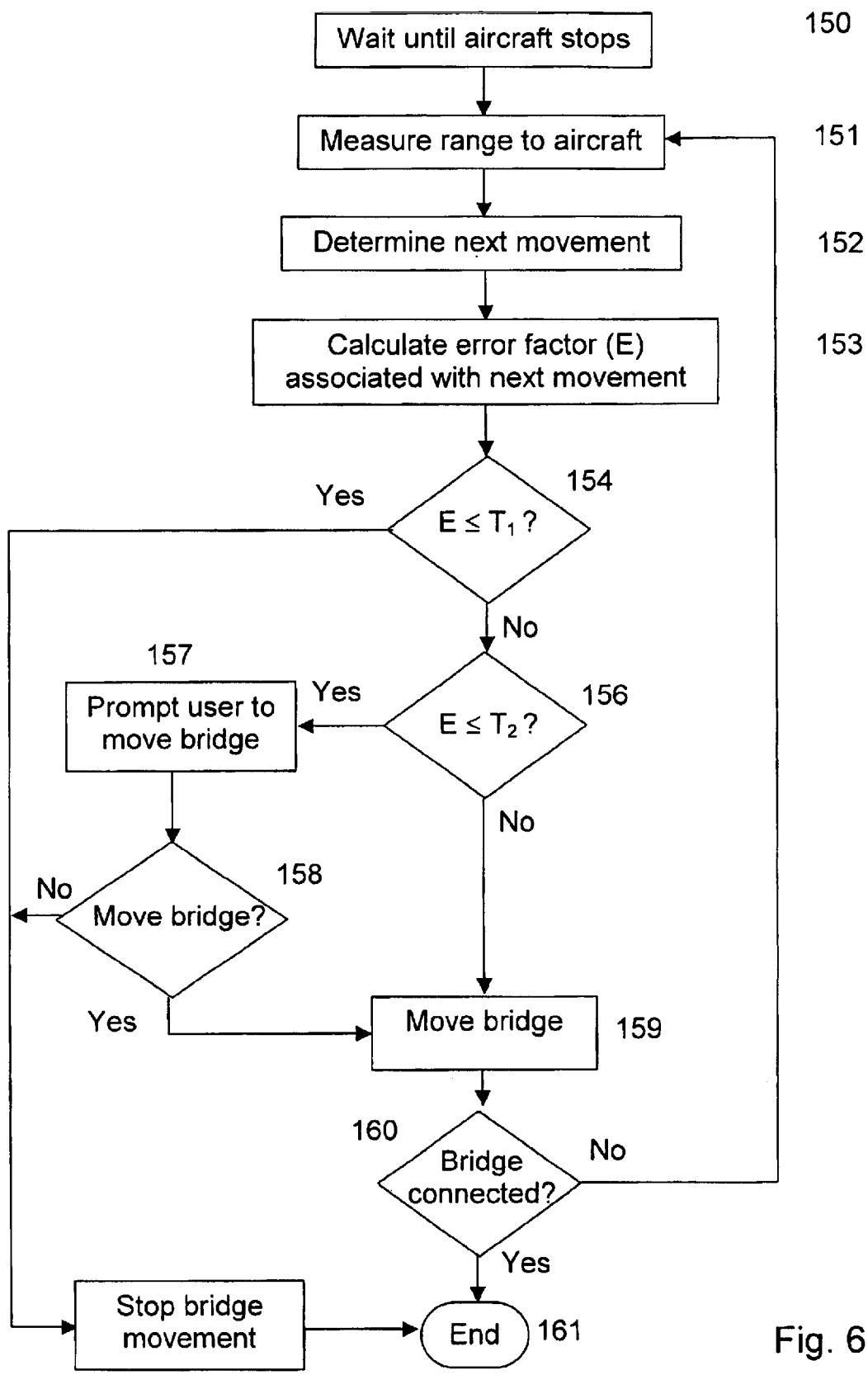
FIG. 6 shows a simplified flow diagram of yet another method of connecting a passenger bridge to an aircraft according to the instant invention.

Referring now to FIG. 6, shown is a simplified flow diagram of yet another method of connecting a passenger bridge to an aircraft according to the instant invention. At step 150 the aircraft comes to a stop at a position adjacent to the passenger bridge 1. The sensor 18 determines the range between the passenger bridge 1 and the aircraft 21 at step 151. The local computer 7, having code in execution thereon, determines at step 152 a next movement for moving the passenger bridge toward the aircraft, in dependence upon the measured distance to the aircraft, predetermined risk tolerance provided to the local computer 7 and other data relating to the type of the aircraft. Prior to moving the passenger bridge, the local computer 7 calculates at step 153 an error factor associated with the determination of the next movement. If at decision step 154 the error factor is determined to be within a first predetermined range of values, then the passenger bridge is automatically stopped at step 155, and the method of FIG. 6 terminates at step 161. For instance, the first predetermined range of values is a range of values less than or equal to a first threshold value $T_1$. If it is determined at decision step 156 that the error factor is within a second predetermined range of values, then at step 157 a prompt is provided to a user to prompt the user for a data input for initiating the determined next movement of the moveable bridge. For instance, the second predetermined range of values is a range of values greater than the first threshold value $T_1$ and less than or equal to a second threshold value $T_2$. Using the control panel 8, the user inputs data in dependence upon a visual assessment of the safety of the next bridge movement. If at decision step 158 it is determined that the user has approved a next bridge movement, then at step 159 the next bridge movement is performed. If at decision step 158 it is determined that the user has denied a next bridge movement, then the passenger bridge is stopped at step 155, and the method of FIG. 6 terminates at step 161. If it is determined at decision step 156 that the error factor is within a third predetermined range of values, then at step 159 the next bridge movement is performed. If it is determined at decision step 160 that the bridge is connected to the aircraft, then the method of FIG. 6 terminates at step 161. If it is determined at decision step 160 that the bridge is not connected, then steps 151 through 160 are repeated. Of course, when the first and second threshold values $T_1$ and $T_2$ are made equal, then the user is never prompted for a data input, and as such the passenger bridge 1 operates in a fully automated manner.

Optionally, prior to waiting for the aircraft to come to a stop at step 150, the model of aircraft is identified and the passenger bridge is moved to a preset position for the identified model of aircraft, for example according to steps 110–113 of the method of FIG. 4 or steps 130–135 of the method of FIG. 5.

Advantageously, the instant invention provides a method for automatically aligning a passenger bridge 1 with an airplane door 20, in which a user specified risk tolerance is used to affect the automated movement of the passenger bridge 1. Setting a low user risk tolerance for colliding with an aircraft results in relatively fewer successful automated alignment operations being completed. Accordingly, a very low risk tolerance will result in the instant invention functioning as a semi-automatic system, in which a bridge-operator is required to complete every alignment. Alternatively, setting a higher risk tolerance will result in relatively fewer incomplete alignment operations and, under ideal conditions, substantially every alignment attempt will be completed in a fully automated manner. In practice, however, a typical risk tolerance setting will result in an advantageous number of alignment operations being completed in a fully automatic maimer, with the balance being aborted before completion in order to ensure that a collision is avoided. Optionally, the system attempts to collect new data using sensor 18 and complete the alignment operation in an automated manner prior to calling for a bridge operator to complete the operation manually.

Further advantageously, when means for identifying a door 20 of the aircraft 21 is provided, the system according to the instant invention can be used without knowledge of the aircraft model to automatically align the passenger bridge 1 with the aircraft door 20. For instance, one of the sensor 18 and a video camera is used to identify the location of the door 20 during the alignment of the passenger bridge 1 to the aircraft door 20. Of course, the approach of the passenger bridge 1 with respect to the aircraft 21 will be stopped automatically if the error factor associated with a 'next' bridge movement is indicative of the 'next' bridge movement being unsafe.

Still further advantageously, the error factor evaluation allows the system according to the instant invention to automatically determine when environmental conditions render the system unsafe to use. For example, heavy rain or dense fog may make the sensor data unreliable, thereby inflating the error factor and causing the system to request a manual alignment.

Optionally, the aircraft 21 is equipped with a transmitter (not shown) for transmitting a location signal to a receiver (not shown) disposed on the passenger bridge 1. For instance, the location signal is based upon known Global Positioning System (GPS) type data. Of course, other positioning systems are envisaged which include sensors and transmitters that are disposed close to ground level at a particular airport. Advantageously, the bridge is provided with a signal that is indicative of the position of the aircraft relative to the end of the passenger bridge, and which further optionally includes data indicative of the model of the aircraft, the airline, the position of a door 20 of the aircraft, etc. Further optionally, additionally imagers and/or proximity sensors are provided on the passenger bridge 1 for confirming distance information during the alignment process and for sensing data that is used to determine an error element associated with a next movement of the passenger bridge 1 toward the door of the aircraft.

Numerous other embodiments may be envisaged without departing from the spirit and scope of the invention.

What is claimed is:

1. An apparatus for positioning one end of a moveable bridge in relation to a door on a craft comprising:
    a sensor for transmitting light and for detecting said light, to determine the position of the one end of the moveable bridge in relation to the craft and for providing a signal in dependence thereon; and,
    a processor for receiving the signal from the sensor and for determining a next movement of the one end of the moveable bridge in dependence upon the signal, the processor also for determining an error factor in the determination of the next movement of the one end of the moveable bridge and for performing one of i) stopping the movement of the one end of the moveable bridge prior to performing the determined next movement and in dependence upon the determined error factor being within a first predetermined range of values, and ii) automatically performing the determined next movement of the one end of the moveable bridge in dependence upon the determined error factor being within a second other predetermined range of values not overlapping the first predetermined range of values.

2. An apparatus according to claim 1 comprising a user interface for when the determined error factor is within a third different predetermined range of values between the first and the second other predetermined range of values, providing a prompt to a user to prompt the user thereof for a data input for initiating the determined next movement of the one end of the moveable bridge.

3. An apparatus according to claim 1 comprising:
    a memory in communication with the processor for storing template data relating to an extractable feature for a plurality of different models of crafts relative to which the one end of the moveable bridge is to be positioned.

4. An apparatus according to claim 1 wherein the sensor includes a transmitter for transmitting a set of electromagnetic pulses and for detecting said electromagnetic pulses, to determine a time difference between the transmission and the detection of said electromagnetic pulses, to thereby determine the position of the one end of the moveable bridge in relation to the craft and for providing a signal in dependence thereon.

5. An apparatus according to claim 1 wherein the sensor comprises a laser range finder.

6. An apparatus according to claim 5 comprising an image processor and a video camera for capturing an image of the craft, the video camera for providing image data to the image processor for use in determining a craft model therefrom.

7. An apparatus for prepositioning a passenger bridge in relation to a door on an aircraft comprising:
    a passenger bridge including a first end moveable for abutting an aircraft having a door and a second end for fixedly engaging a building;
    a sensor for transmitting light and for detecting said light, to determine the position of the first end of the passenger bridge in relation to the aircraft and for providing a signal in dependence thereof;
    a processor for receiving the signal from the sensor and for determining a next movement of the first end of the passenger bridge in dependence upon the signal, the processor also for determining an error factor in the determination of the next movement of the bridge and for comparing the determined error factor to a threshold value and for providing a control signal in dependence upon the determined error factor;
    a memory in communication with the processor for storing template data relating to an extractable feature for a plurality of different models of aircrafts relative to which the first end of the passenger bridge is to be positioned; and,
    a mechanism in communication with the processor for receiving the control signal therefrom, the mechanism for prepositioning the first end of the passenger bridge to a predetermined position in dependence upon the received control signal.

8. An apparatus according to claim 7 wherein the sensor includes a transmitter for transmitting a set of electromagnetic pulses and for detecting said electromagnetic pulses, to determine a time difference between the transmission and the detection of said electromagnetic pulses, to thereby determine the position of the first end of the passenger bridge in relation to the craft and for providing a signal in dependence thereof.

9. An apparatus according to claim 7 wherein the sensor comprises a laser range finder.

10. An apparatus according to claim 9 comprising an image processor and a video camera for capturing an image of the craft, the video camera for providing image data to the image processor for use in determining a craft model therefrom.

11. An apparatus for positioning one end of a moveable bridge in relation to a door on a craft comprising:
    an imager for capturing a plurality of images of a craft and for providing a signal indicative of some of the plurality of images;
    an image processor for receiving the signal from the imager, for determining a craft model therefrom, and for providing a second signal indicative of the determined craft model; and,
    a controller for receiving the second signal from the image processor and for determining a next movement of the one end of the moveable bridge in dependence upon the second signal, the processor also for determining an error factor in the determination of the next movement of the one end of the moveable bridge and for i) stopping the movement of the one end of the moveable bridge in dependence upon the determined error factor being within a first predetermined range of values, and ii) automatically performing the determined next movement of the one end of the moveable bridge in dependence upon the determined error factor being within a second other predetermined range of values not overlapping the first predetermined range of values.

12. An apparatus according to claim 11 comprising a user interface for when the determined error factor is within a third different predetermined range of values between the first and the second other predetermined range of values, providing a prompt to a user to prompt the user thereof for a data input for initiating the determined next movement of the one end of the moveable bridge.

13. An apparatus according to claim 11 comprising:
a memory in communication with the image processor for storing template data relating to features of a plurality of different craft models relative to which the one end of the moveable bridge is to be positioned.

14. An apparatus according to claim 11 comprising:
a memory in communication with the image processor for storing template data relating to a scale three-dimensional image of a plurality of different craft models relative to which the one end of the moveable bridge is to be positioned.

15. An apparatus according to claim 11 wherein the imager comprises a video camera.

16. A method for positioning one end of a moveable bridge in relation to a door on a craft comprising the steps of:
a) determining the position of the one end of the moveable bridge in relation to the craft;
b) determining a next movement of the one end of the moveable bridge in dependence upon the determined position, the next movement of the one end of the moveable bridge for moving the one end of the moveable bridge toward the craft;
c) determining an error factor associated with the determination of the next movement of the one end of the moveable wherein the error factor is reflective of the difference between the determined next movement and the potential movement resulting from a performance of the determined next movement bridge; and,
d) performing the determined next movement of the bridge in dependence upon the determined error factor being within a predetermined range of values.

17. A method according to claim 16 wherein the predetermined range of values is indicative of the determination being more accurate and less susceptible to error than some values outside the predetermined range.

18. A method according to claim 16 comprising the step of:
stopping the movement of the one end of the moveable bridge in dependence upon the determined error factor being within a second predetermined range of values.

19. A method according to claim 16 comprising the step of:
providing a prompt to a user to prompt the user thereof for a data input for initiating the determined next movement of the one end of the moveable bridge in dependence upon the determined error factor being within a third predetermined range of values, the third predetermined range of values between the predetermined range and the second predetermined range of values.

20. A method according to claim 16 comprising the step of:
e) iterating the steps a) through d) until the one end of the one end of the moveable bridge is in a stopping position,
wherein the stopping position is a position in which the one end of the moveable bridge is in aligned engagement with the door on the craft.

21. A method according to claim 16 comprising the step of:
e) determining a new position of the one end of the moveable bridge in relation to the craft; and,
f) when the new position is other than a stopping position, repeating the steps b) through d),
wherein the stopping position is a position in which the one end of the moveable bridge is in aligned engagement with the door on the craft.

22. A method according to claim 16 comprising the steps prior to step a) of:
capturing an image of the craft;
characterizing the image of the craft to extract features relating to the craft;
comparing the extracted features with stored template features; and,
identifying a model of the craft in dependence upon a result of the comparison.

23. A method according to claim 22 comprising the step of:
retrieving information relating to the position of a door on the identified model of the craft; and,
determining, in dependence upon the retrieved information, an expected stopping position of the door on the identified model of the craft relative to the one end of the moveable bridge; and,
determining the next movement of the one end of the moveable bridge in dependence upon the expected stopping position of the door on the identified model of the craft.

24. A method according to claim 16 wherein the step of a) determining the position of the one end of the moveable bridge in relation to the craft comprises the steps of:
a1) transmitting electromagnetic radiation using a sensor mounted on the moveable bridge and directed toward the craft;
a2) detecting electromagnetic radiation having the same wavelength as the transmitted radiation;
a3) measuring the time between the transmission of radiation and the detection of radiation, thereby determining the position of the one end of the moveable bridge in relation to the craft.

25. A method according to claim 16 comprising the step of:
retrievably storing diagnostic data in dependence upon the performed next move of the one end of the moveable bridge.

26. A method according to claim 25 wherein the step c) of determining an error factor associated with the determination of the next movement of the one end of the moveable bridge is determined in dependence upon the stored diagnostic data.

27. A method according to claim 24 wherein the electromagnetic radiation is transmitted using a laser range finder.

28. A method according to claim 16 wherein the predetermined range of values is provided by a user of the moveable bridge.

29. A method according to claim 16 wherein the predetermined range of values is a default range of values.

30. A method according to claim 16 wherein the door of the aircraft to which the one end of the moveable bridge is to be positioned is selected from a plurality of doors of the aircraft.

31. A method for positioning one end of a moveable bridge in relation to a door on an aircraft comprising the steps of:
  a) determining the position of the one end of the moveable bridge in relation to the aircraft;
  b) identifying a model of the aircraft and retrieving information relating to the position of a door on the identified model of the aircraft;
  c) determining, in dependence upon the retrieved information, an expected stopping position of the door on the identified model of the aircraft;
  d) determining a next movement of the one end of the moveable bridge in dependence upon the determined position of the one end of the moveable bridge and the expected stopping position of the door on the identified model of the aircraft, the next movement of the one end of the moveable bridge for moving the one end of the moveable bridge toward the expected stopping position of the door on the identified model of the aircraft;
  e) determining an error factor associated with the determination of the next movement of the one end of the moveable wherein the error factor is reflective of the difference between the determined next movement and the potential movement resulting from a performance of the determined next movement bridge; and,
  f) performing the determined next movement of the bridge in dependence upon the determined error factor being within a predetermined range of values.

32. A method according to claim 31 wherein the predetermined range of values is indicative of the determination being more accurate and less susceptible to error than some values outside the predetermined range.

33. A method according to claim 31 wherein the step b) comprises the steps of:
  b1) capturing an image of the aircraft;
  b2) characterizing the image of the aircraft to extract features relating to the aircraft;
  b3) comparing the extracted features with stored template features; and,
  b4) identifying a model of the aircraft in dependence upon a result of the comparison.

34. A method according to claim 31 comprising the step of:
  e) iterating the steps a) through d) until the one end of the moveable bridge is in a stopping position,
    wherein the stopping position is a position in which the one end of the moveable bridge is in aligned engagement with the door on the aircraft.

35. A method according to claim 31 wherein the predetermined range of values is provided by a user of the moveable bridge.

36. A method according to claim 31 wherein the door of the aircraft to which the one end of the moveable bridge is to be positioned is selected from a plurality of doors of the aircraft.

37. An apparatus for positioning one end of a moveable bridge in relation to a door on a craft comprising:
  a sensor for sensing a location of the craft relative to the one end of the moveable bridge and for providing sensor data in dependence upon the sensed location; and,
  a controller for receiving the sensor data, and for determining a next movement of the one end of the moveable bridge toward the sensed craft in dependence upon the sensor data, the controller also for determining an error factor in the determination of the next movement of the one end of the moveable bridge toward the sensed craft and for performing one of i) stopping the movement of the one end of the moveable bridge prior to performing the determined next movement and in dependence upon the determined error factor being within a first predetermined range of values, and ii) automatically performing the determined next movement of the one end of the moveable bridge toward the sensed craft in dependence upon the determined error factor being within a second other predetermined range of values not overlapping the first predetermined range of values.

38. An apparatus according to claim 37 comprising a user interface for when the determined error factor is within a third different predetermined range of values between the first and the second other predetermined range of values, providing a prompt to a user to prompt the user thereof for a data input for initiating the determined next movement of the one end of the moveable bridge toward the sensed craft.

* * * * *